US011011154B2

(12) United States Patent
Yang et al.

(10) Patent No.: US 11,011,154 B2
(45) Date of Patent: May 18, 2021

(54) ENHANCING HYBRID SELF-ATTENTION STRUCTURE WITH RELATIVE-POSITION-AWARE BIAS FOR SPEECH SYNTHESIS

(71) Applicant: TENCENT AMERICA LLC, Palo Alto, CA (US)

(72) Inventors: Shan Yang, Shenzhen (CN); Heng Lu, Bellevue, WA (US); Shiyin Kang, Shenzhen (CN); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 160 days.

(21) Appl. No.: 16/271,154

(22) Filed: Feb. 8, 2019

(65) Prior Publication Data
US 2020/0258496 A1 Aug. 13, 2020

(51) Int. Cl.
G10L 13/047 (2013.01)
G06N 3/04 (2006.01)
(Continued)

(52) U.S. Cl.
CPC .......... G10L 13/047 (2013.01); G06N 3/0454 (2013.01); G06N 3/08 (2013.01); G10L 13/07 (2013.01)

(58) Field of Classification Search
CPC .................................................... G06N 3/0454
(Continued)

(56) References Cited

U.S. PATENT DOCUMENTS

2019/0122651 A1* 4/2019 Arik .................. G10L 13/08
2019/0311708 A1* 10/2019 Bengio .................. G06N 3/084
2020/0134804 A1* 4/2020 Song .................... G06N 3/0454

FOREIGN PATENT DOCUMENTS

WO WO-2018183650 A2 * 10/2018 ............. G10L 13/04

OTHER PUBLICATIONS

A. Tjandra, S. Sakti and S. Nakamura, "Multi-Scale Alignment and Contextual History for Attention Mechanism in Sequence-to-Sequence Model," 2018 IEEE Spoken Language Technology Workshop (SLT), Athens, Greece, 2018, pp. 648-655, doi: 10.1109/SLT.2018.8639528. (Year: 2018).*

(Continued)

Primary Examiner — Bharatkumar S Shah
(74) Attorney, Agent, or Firm — Sughrue Mion, PLLC

(57) ABSTRACT

A method of performing speech synthesis, includes encoding character embeddings, using any one or any combination of convolutional neural networks (CNNs) and recurrent neural networks (RNNs), applying a relative-position-aware self attention function to each of the character embeddings and an input mel-scale spectrogram, and encoding the character embeddings to which the relative-position-aware self attention function is applied. The method further includes concatenating the encoded character embeddings and the encoded character embeddings to which the relative-position-aware self attention function is applied, to generate an encoder output, applying a multi-head attention function to the encoder output and the input mel-scale spectrogram to which the relative-position-aware self attention function is applied, and predicting an output mel-scale spectrogram, based on the encoder output and the input mel-scale spectrogram to which the multi-head attention function is applied.

17 Claims, 8 Drawing Sheets

(51) Int. Cl.
   *G06N 3/08*      (2006.01)
   *G10L 13/07*     (2013.01)
(58) Field of Classification Search
   USPC .................................................. 704/268, 259
   See application file for complete search history.

(56) References Cited

OTHER PUBLICATIONS

International Search Report and Written Opinion in International Application No. PCT/US20/16704, dated May 4, 2020.
Jonathan Shen et al., "Natural TTS Synthesis by Conditioning Wavenet on Mel Spectrogram Predictions", Retrieved from the Internet: <URL: https://arxiv.org/abs/1712.05884>, Feb. 16, 2018, pp. 1-5 (5 pages total).
Wei Ping et al., "Deep Voice 3: Scaling Text-to-Speech with Convolutional Sequence Learning", ICLR, Feb. 22, 2018, pp. 1-16 (16 pages total).
Naihan Li et al., "Neural Speech Synthesis with Transformer Network", Retrieved from the Internet: <URL: https://arxiv.org/abs/1809.08895>, Jan. 30, 2019, pp. 1-8 (8 pages total).

\* cited by examiner

ENHANCING HYBRID SELF-ATTENTION STRUCTURE WITH RELATIVE-POSITION-AWARE BIAS FOR SPEECH SYNTHESIS

BACKGROUND

Text-to-speech (TTS) technology is advancing as it moves from hidden Markov models (HMM) to neural networks (NN). For either an HMM or NN-based TTS system, a framework is composed of three major components: 1) a complex "front-end" module to analyze raw text into a linguistic feature. 2) a "back-end" module to learn and transform linguistic features to acoustic features, and 3) a "vocoder" to reconstruct speech waveform from the generated acoustic features. The "front-end" module is language dependent, and designing a good "front-end" may require expert knowledge on a specific language as well as great time and effort.

Recently, successful applications of an attention-based sequence-to-sequence (seq2seq) model are outperforming conventional structures including several end-to-end speech synthesis systems. The attention mechanism can jointly learn alignments and perform linguistic-feature-to-acoustic-feature mapping, to train and infer from a "text end" to a "speech end" as a whole.

The emergence of these seq2seq-based speech synthesis models such as Tacotron discards an independently-designed text analyzer, and replaces traditional aligned linguistic-frame-to-acoustic-frame mapping networks by an encoder-decoder paradigm. The basic idea of Tacotron is to use recurrent neural networks (RNNs) to encode a text symbol sequence and then generate a variable length output acoustic feature sequence with decoder RNNs. The encoder and decoder are connected through a soft attention mechanism. Because such recurrent architecture relies on the entire past information during hidden state computations, a fully convolutional neural networks (CNNs)-based seq2seq framework has been proposed to enable parallel training. Compared to RNNs, convolutions collect local contexts by kernels, and catch long-range dependencies by a large receptive field created by stacking CNN layers. This kind of architecture is successfully used in speech synthesis areas such as Deep Voice 3 and Deep Convolutional TTS (DCTTS).

More recently, a more parallelizable architecture named Transformer has been proposed to model global dependencies between inputs and outputs, whilst address a vanishing gradients problem of RNNs. Transformer is solely based on attention mechanisms to achieve seq2seq modeling, which requires a minimum number of sequential operations during training. With self-attention, Transformer can attend whole sequence information at each position. Furthermore, self-attention has a shorter path length between long-range dependencies than RNN and CNN, which makes it easier to learn. Almost at the same time of this work, the Transformer architecture has been successfully applied to a speech synthesis task, which shows a good capability of generating speech with self-attention.

However, there are also shortcomings in a self-attention mechanism. Firstly, recent research points out that there is no position guidance in self-attention, so extra position encoding is injected to handle sequential information. Secondly, a weighted averaging operation in self-attention may lead to dispersion of a distribution of attention, which results in overlooking a relation of neighboring signals. In speech synthesis experiments, even by adding position encoding in a self-attention-based TTS system, a computer may be found talking nonsense from time to time. Thirdly, full self-attention may not perform as well as RNNs when modeling underlying hierarchical structures in many tasks.

SUMMARY

According to embodiments, a method of performing speech synthesis, includes encoding character embeddings, using any one or any combination of convolutional neural networks (CNNs) and recurrent neural networks (RNNs), applying a relative-position-aware self attention function to each of the character embeddings and an input mel-scale spectrogram, and encoding the character embeddings to which the relative-position-aware self attention function is applied. The method further includes concatenating the encoded character embeddings and the encoded character embeddings to which the relative-position-aware self attention function is applied, to generate an encoder output, applying a multi-head attention function to the encoder output and the input mel-scale spectrogram to which the relative-position-aware self attention function is applied, and predicting an output mel-scale spectrogram, based on the encoder output and the input mel-scale spectrogram to which the multi-head attention function is applied.

According to embodiments, an apparatus for performing speech synthesis, includes at least one memory configured to store program code, and at least one processor configured to read the program code and operate as instructed by the program code. The program code includes first encoding code configured to cause the at least one processor to encode character embeddings, using any one or any combination of convolutional neural networks (CNNs) and recurrent neural networks (RNNs), first applying code configured to cause the at least one processor to apply a relative-position-aware self attention function to each of the character embeddings and an input mel-scale spectrogram, and second encoding code configured to cause the at least one processor to encode the character embeddings to which the relative-position-aware self attention function is applied. The program code further includes concatenating code configured to cause the at least one processor to concatenate the encoded character embeddings and the encoded character embeddings to which the relative-position-aware self attention function is applied, to generate an encoder output, second applying code configured to cause the at least one processor to apply a multi-head attention function to the encoder output and the input mel-scale spectrogram to which the relative-position-aware self attention function is applied, and predicting code configured to cause the at least one processor to predict an output mel-scale spectrogram, based on the encoder output and the input mel-scale spectrogram to which the multi-head attention function is applied.

According to embodiments, a non-transitory computer-readable medium stores instructions that, when executed by at least one processor of a device, cause the at least one processor to encode character embeddings, using any one or any combination of convolutional neural networks (CNNs) and recurrent neural networks (RNNs), apply a relative-position-aware self attention function to each of the character embeddings and an input mel-scale spectrogram, and encode the character embeddings to which the relative-position-aware self attention function is applied. The instructions further cause the at least one processor to concatenate the encoded character embeddings and the encoded character embeddings to which the relative-position-aware self attention function is applied, to generate an encoder output, apply a multi-head attention function to the encoder output and the input mel-scale spectrogram to which the relative-position-aware self attention function is applied, and predict an output mel-scale spectrogram, based on the encoder output and the input mel-scale spectrogram to which the multi-head attention function is applied.

DETAILED DESCRIPTION

Embodiments include a hybrid architecture with relative-position-aware self-attention to handle the above-mentioned issues in speech synthesis. For the first two issues, the relative-position-aware structure is employed into self-attention to inject relative position relations among all positions, whilst enhancing local relations to avoid overlooking. For the third problem, an RNN and CNN-based architecture with self-attention is used in the speech synthesis system, including a multi-tower hybrid framework, which achieves the best Mean Opinion Score (MOS) among all systems.

In detail, a hybrid self-attention structure combines self-attention with recurrent networks for speech synthesis, and later is enhanced with relative-position-aware biases. Based on MOS test results, the proposed hybrid structure outperforms any single CBHG (Convolution Block Highway Gated Recurrent Unit) or CNN self-attention structure. By adding a relative-position-aware representation into self-attention, all systems with absolute position encoding can be further improved in terms of synthesis speech naturalness. As the MOS test results show, the proposed relative-position-aware representation-enhanced hybrid self-attention speech synthesis system has the best MOS score of only 0.11 MOS below natural recording.

Figure 1A:
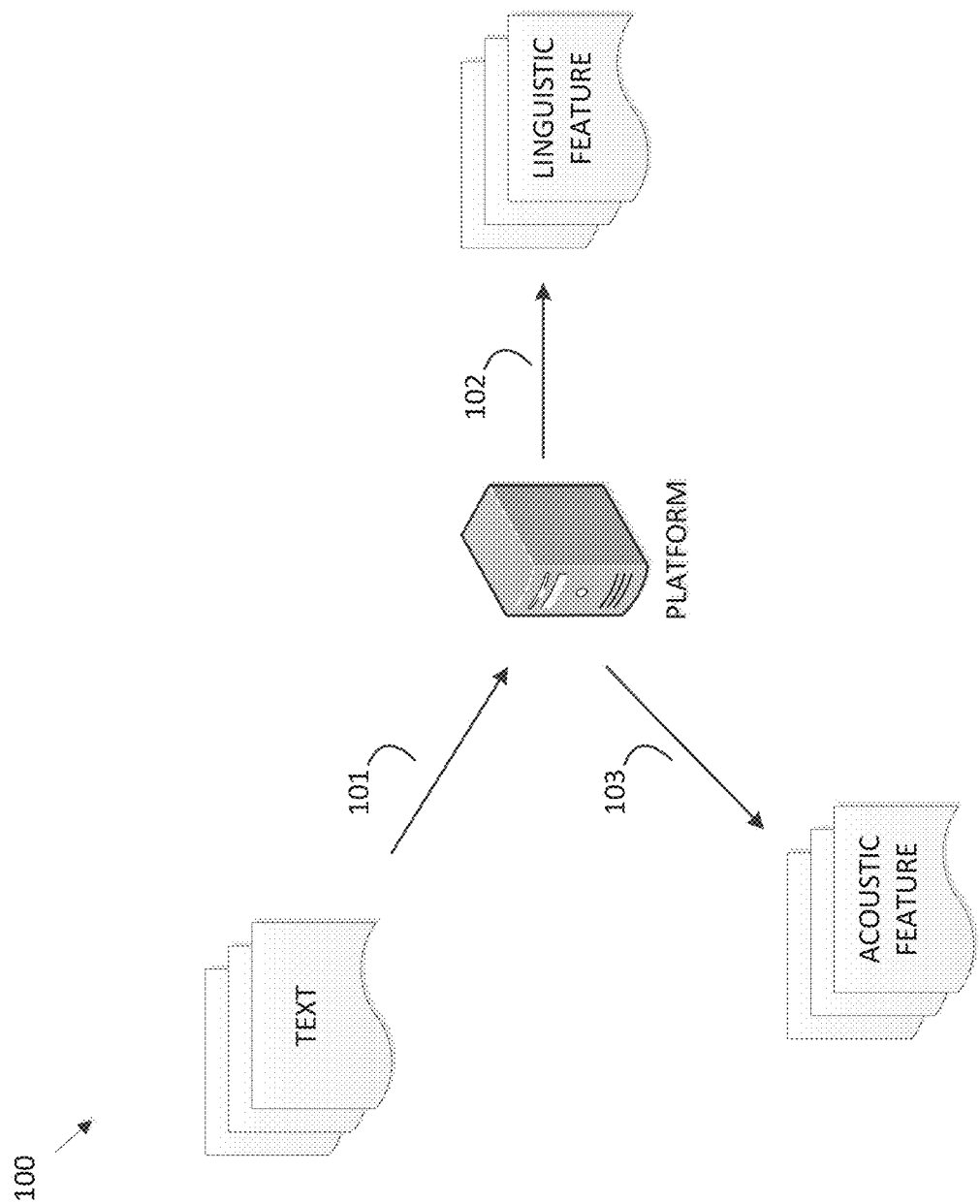
FIGS. 1A and 1B are diagrams of a TTS process according to embodiments.
Figure 1B:
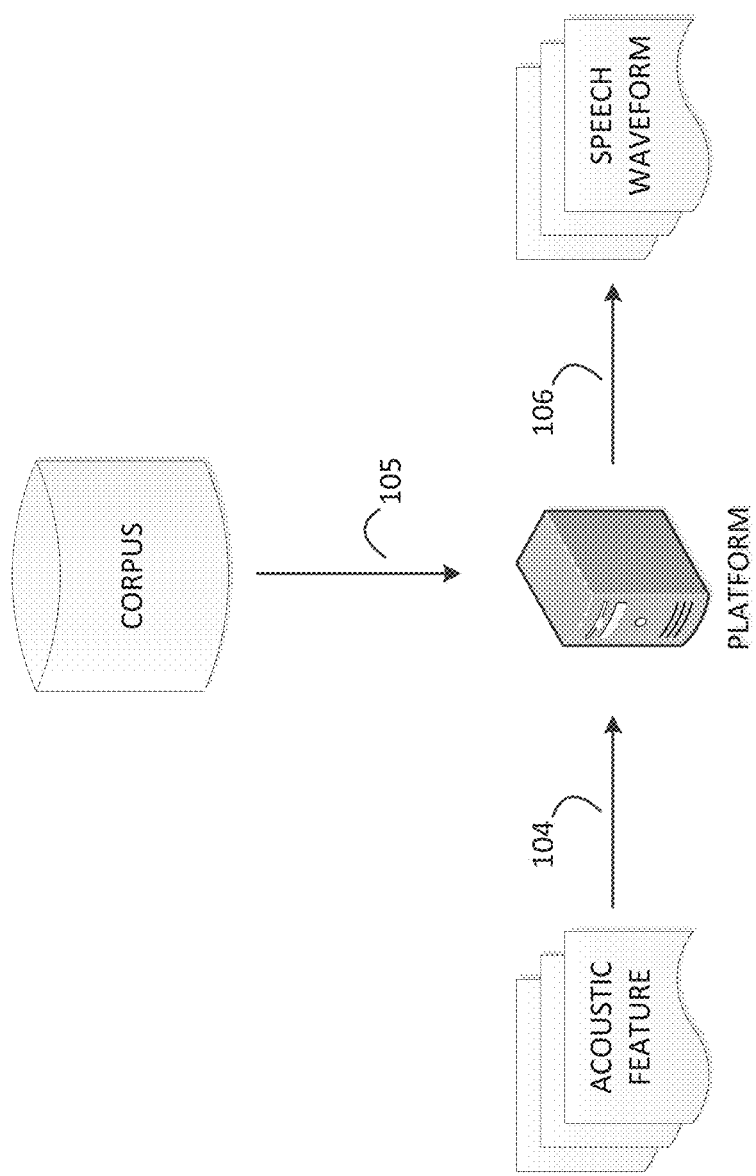

FIGS. 1A and 1B are diagrams of a TTS process 100 according to embodiments. As shown in FIG. 1A, and by reference number 101, a platform (e.g., a server) obtains text. Further, as shown by reference number 102, the platform analyzes the text to generate at least one linguistic feature. As shown by reference number 103, the platform learns the at least one linguistic feature and transforms the learned at least one linguistic feature into at least one acoustic feature. The platform generates the at least one acoustic feature, using techniques described in more detail in association with FIGS. 4-7.

As shown in FIG. 1B, and by reference number 104, the platform obtains the at least one acoustic feature generated in association with FIG. 1A. Further, and as shown by reference number 105, the platform obtains a corpus including speech segments. As shown by reference number 106, the platform generates a speech waveform by selecting, from the corpus, one or more of the speech segments, using the generated at least one acoustic feature, and concatenating the selected one or more of the speech segments.

Figure 2:
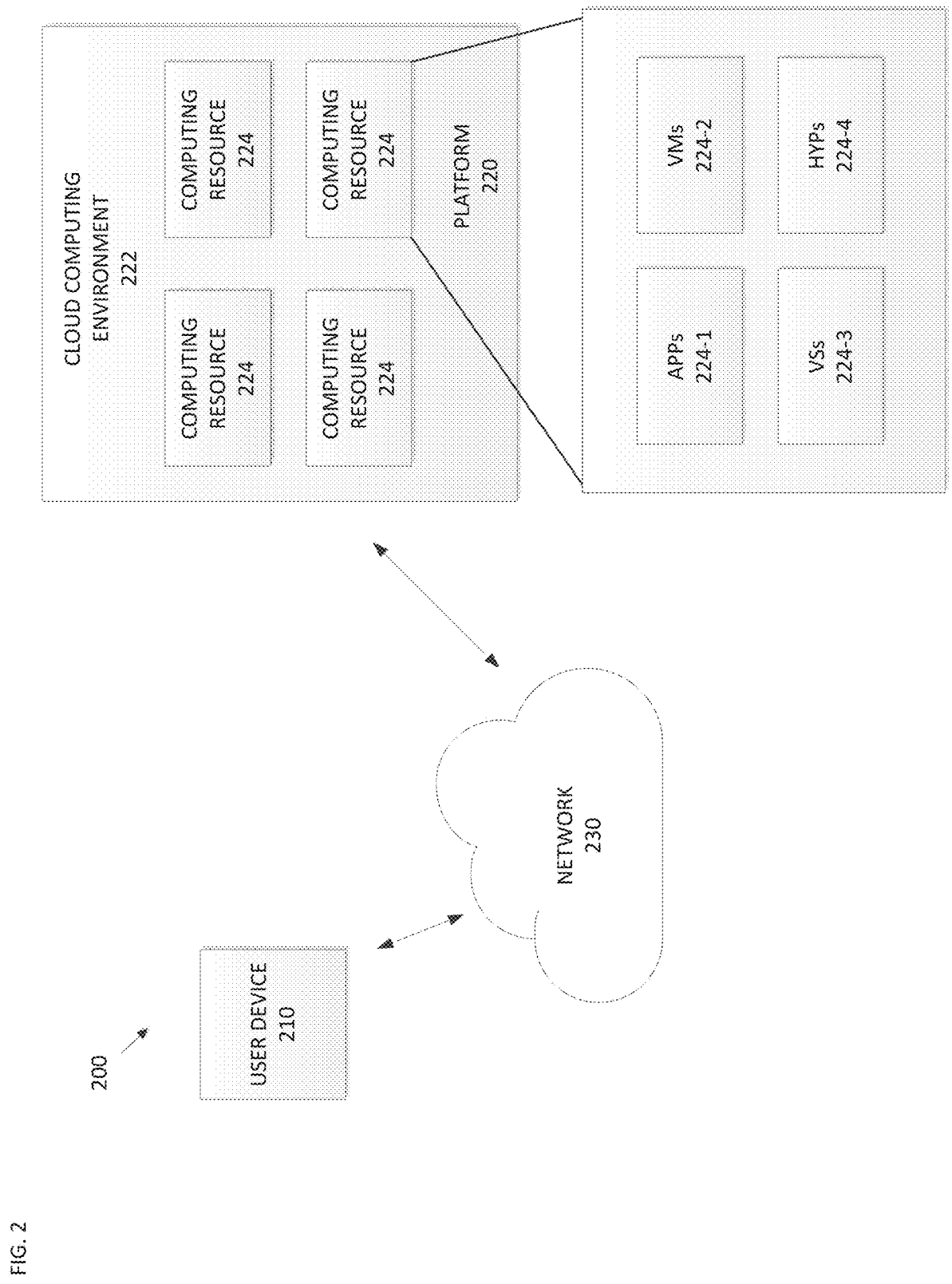
FIG. 2 is a diagram of an environment in which methods, apparatuses and systems described herein may be implemented, according to embodiments.

FIG. 2 is a diagram of an environment 200 in which methods, apparatuses and systems described herein may be implemented, according to embodiments. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices as described elsewhere herein. In some implementations, platform 220 may include a cloud server or a group of cloud servers. In some implementations, platform 220 may be designed to be modular such that software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
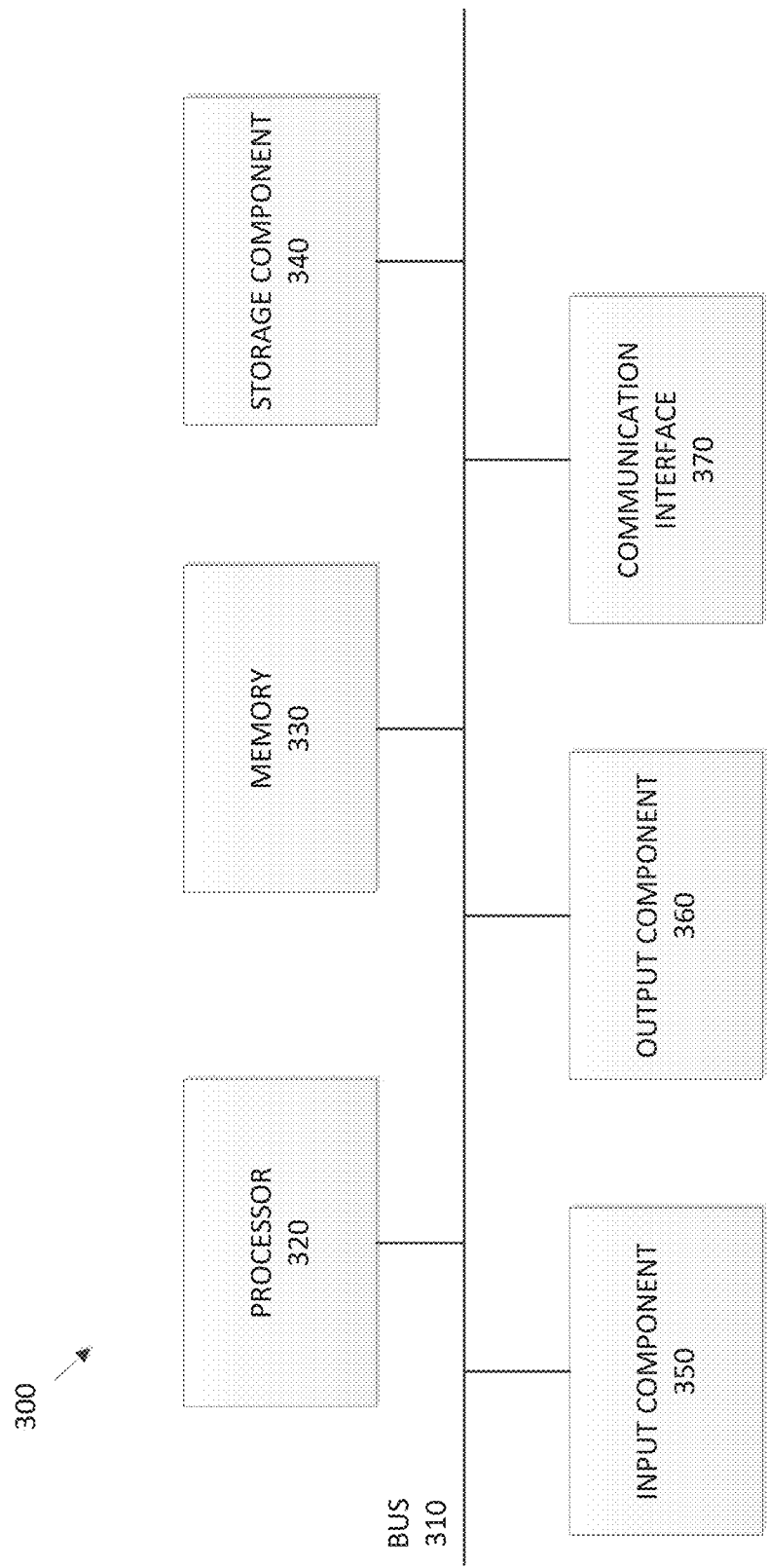
FIG. 3 is a diagram of example components of one or more devices of FIG. 2.

FIG. 3 is a diagram of example components of one or more devices of FIG. 2. A device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
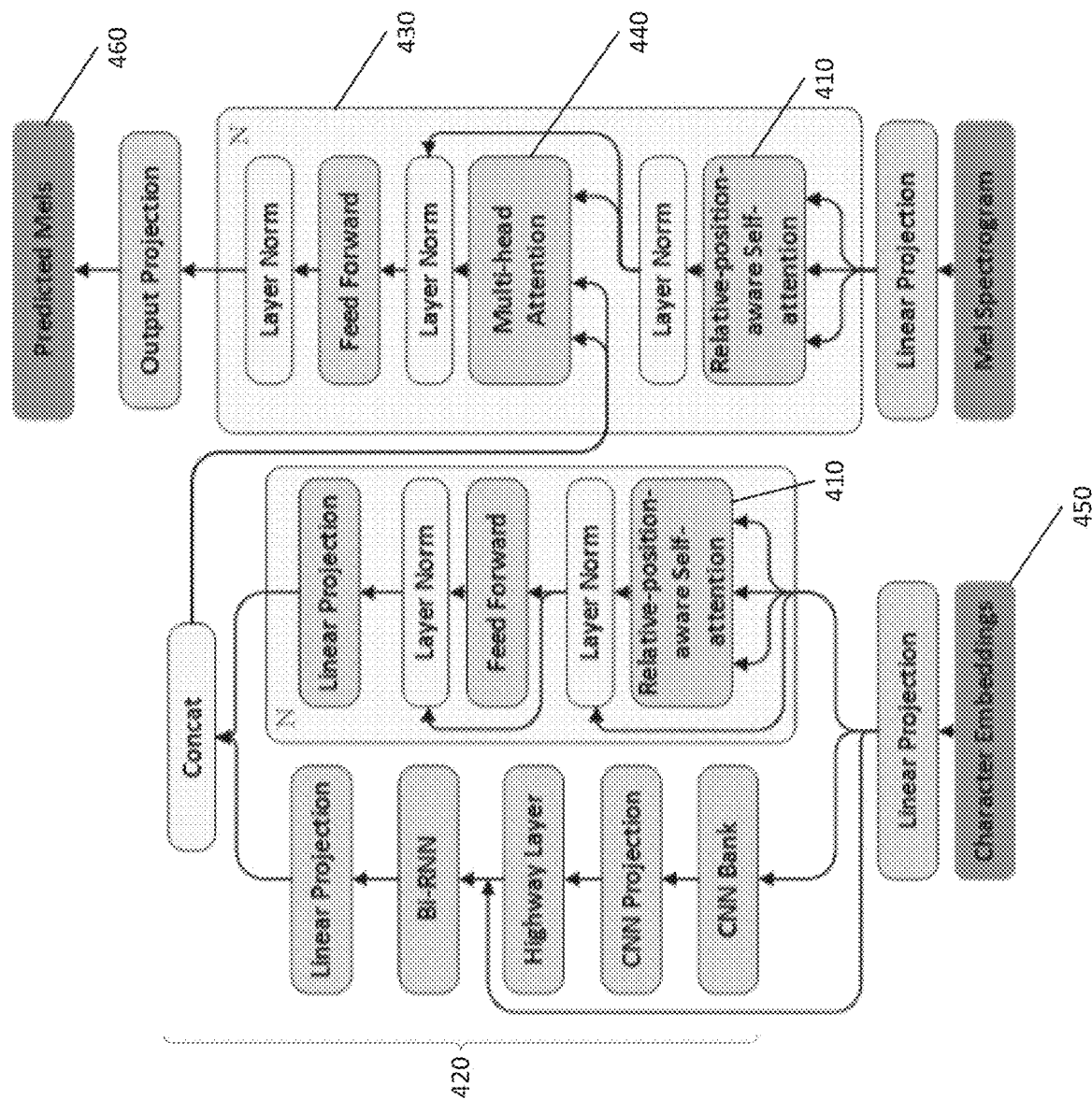
FIG. 4 is a diagram of a TTS system architecture according to embodiments.

FIG. 4 is a diagram of a TTS system architecture according to embodiments. As shown in FIG. 4, a hybrid architecture with relative-position-aware self-attention 410 is shown. The hybrid architecture includes a multi-tower hybrid encoder 420, an N-block self-attention-based decoder 430, and a multi-head attention 440 to connect the encoder 420 and the decoder 430. Character embeddings 450 related to at least one linguistic feature are used as input to predict a mel-scale spectrogram 460 related to at least one acoustic feature that is output. A WaveNet condition on the mel-scale spectrogram 460 is employed as a vocoder to reconstruct audios. Details of the components are described below.

In FIG. 4, each layer normalization layer "Layer Norm" applies layer normalization to an output of a layer below the layer normalization layer. Each feed-forward layer "Feed Forward" receive an input at an input position and apply a sequence of feed forward transformations to the input to generate an output for the input position. For example, the sequence of feed forward transformations can include learned linear transformations each separated by an activation function, e.g., a non-linear elementwise activation function.

Further in FIG. 4, each linear layer "Linear Projection" or "Output Projection" applies a learned linear transformation to an output of a layer below the linear layer, to project the output into an appropriate space for further processing.

Figure 5:
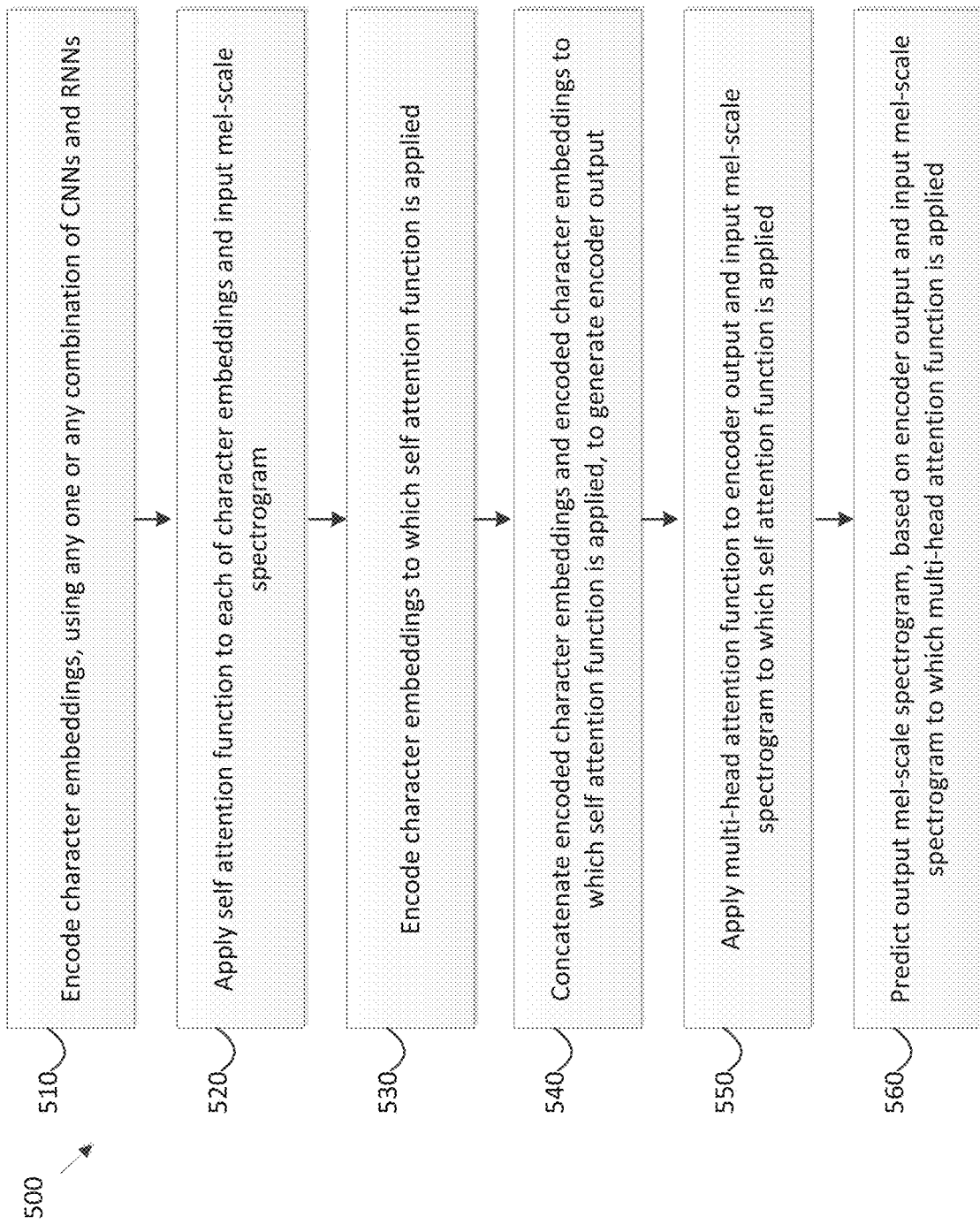
FIG. 5 is a flowchart of a method of performing speech synthesis, according to embodiments.

FIG. 5 is a flowchart of an example method 500 of performing speech synthesis, according to embodiments. In some implementations, one or more process blocks of FIG. 5 may be performed by platform 220. In some implementations, one or more process blocks of FIG. 5 may be performed by another device or a group of devices separate from or including platform 220, such as user device 210.

As shown in FIG. 5, in operation 510, the method 500 includes encoding character embeddings, using any one or any combination of CNNs and RNNs.

In operation 520, the method 500 includes applying a relative-position-aware self attention function to each of the character embeddings and an input mel-scale spectrogram.

In detail, given a sequence as a query Q, an attention function tends to output a weighted sum of a source sequence value V, where a key K is an index of V. Attention mechanisms conduct a single function among Q, K and V, as shown in Equation (1):

$$\text{Attention}(Q,K,V) = f(Q,K)V \quad (1)$$

where $f(Q, K)$ is a score function with softmax, such as Bandanau and Luong score functions. In Equation (2), a scaled dot-product score function is used:

$$f(Q, K) = \text{softmax}\left(\frac{QK^T}{\sqrt{d_k}}\right) \quad (2)$$

where $d_k$ is a dimension of K.

In operation 530, the method 500 includes encoding the character embeddings to which the relative-position-aware self attention function is applied.

In operation 540, the method 500 includes concatenating the encoded character embeddings and the encoded character embeddings to which the relative-position-aware self attention function is applied, to generate an encoder output.

In operation 550, the method includes applying a multi-head attention function to the encoder output and the input mel-scale spectrogram to which the relative-position-aware self attention function is applied.

In detail, different from the single attention function, multi-head attention tends to project Q, K and V into a different subspace h times, where h is a number of heads. It allows the model to jointly learn from different representations of heads, which is beneficial for many tasks. For each head $head_i$, the attention is computed as in Equation (3):

$$head_i = \text{Attention}(QW_i^Q, KW_i^K, VW_i^V) \quad (3)$$

where $W_i^Q$, $W_i^K$, $W_i^V$ and $W_i^O$ are different parameter matrices in linear projections. Then, all heads followed by a output projection are concatenated to obtain final attentions.

Self-attention is a special case of multi-head attention, where Q and V are from a same sentence $x=(x_1, x_2, \ldots, x_n)$. Equation (2) shows how self-attention works. Given x of n elements, Equation (4) shows a latent representation z with the same length n:

$$z_i = \sum_{j=1}^{n} \alpha_{ij}(x_j W^V) \quad (4)$$

where $\alpha_{ij}$ is a weight computed from the score function described in Equation (2), as shown in Equations (5) and (6):

$$\alpha_{ij} = \frac{\exp(e_{ij})}{\sum_{k=1}^{n} \exp(e_{ik})} \quad (5)$$

$$e_{ij} = \frac{(x_i W^Q)(x_j W^K)^T}{\sqrt{d_k}} \quad (6)$$

Therefore, each latent $z_i$ can assemble global dependencies on a whole sequence x. Because there is no recurrence or convolution in self-attention, it may be difficult to model sequential information. To overcome this problem, Transformer injects position information in network inputs, where sine and cosine functions are used to encode positions.

When modeling global dependencies, self-attention ignores distances between symbols or frames. However in speech synthesis, local contexts usually play a more important role in learning how people speak.

Edges between elements $x_i$ and $x_j$ are added to enhance local relations. Equation (6) shows that a part $x_j W^K$ mainly decides a contribution of $x_j$ for generating $e_{ij}$ given $x_i$. Thus, Equation (6) is additionally modeled for localness in Equation (7):

$$e_{ij} = \frac{(x_i W^Q)(x_j W^K + a_{ij}^K)^T}{\sqrt{d_k}} \quad (7)$$

where $a_{ij}^K$ is an edge representation for matrix K, which strengthens a relative contribution of $x_j$ for $e_i$. Another edge $a_{ij}^V$ for V may be injected into Equation (4). But this is found to not bring improvements in the system. So, in embodiments, relative representations $a^K$ are used.

To enhance neighboring relations, and to generate different sequence lengths not seen in training, a maximum relative position is clipped to m in both directions. Then, there are 2m+1 unique relative representations. Each edge representation can be written as shown in Equations (8) and (9):

$$a_{ij}^K = \omega_{clip(j-i,m)}^K \quad (8)$$

$$clip(x,m) = max(-m, min(m,x)) \quad (9)$$

Figure 6:
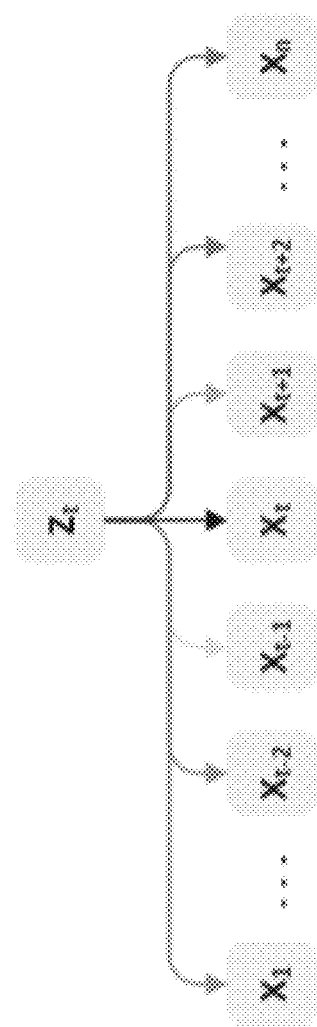
FIG. 6 is a diagram of relative edges representation, according to embodiments.

FIG. 6 is a diagram of relative edges representation, according to embodiments.

Referring to FIG. 6, the relative edges representation are shown with m=2. When generating $z_t$, there are n additional edges $a_{tj}^K$, where different arrows represent different vectors. For $j \leq t-2$ or $j \geq t+2$, a representation is clipped to the same $\omega_{-2}^K$ and $\omega_2^K$, respectively.

Relative position representations are learned by $\omega$. Instead of fixed distances, learnable Gaussian bias can also be applied here to model localness, which may be softer and more suitable.

Referring again to FIG. 5, in operation 560, the method 500 includes predicting an output mel-scale spectrogram, based on the encoder output and the input mel-scale spectrogram to which the multi-head attention function is applied.

The method 500 may further include generating a speech waveform, based on the predicted output mel-scale spectrogram.

The applying the multi-head attention function may include modifying the multi-head attention function to enhance local relations, using an edge representation for a matrix, and applying the modified multi-head attention function to the encoder output and the input mel-scale spectrogram to which the relative-position-aware self attention function is applied.

The applying the multi-head attention function may include modifying the multi-head attention function to enhance local relations, by clipping, in both directions, a maximum relative position of an edge representation for a matrix, and applying the modified multi-head attention function to the encoder output and the input mel-scale spectrogram to which the relative-position-aware self attention function is applied.

The encoding the character embeddings to which the relative-position-aware self attention function is applied may include applying a layer normalization, a sequence of feed forward transformations, and a learned linear transformation to the relative-position-aware self attention function is applied.

The method 500 may further include applying a layer normalization, a sequence of feed forward transformations, and a learned linear transformation to the encoder output and the input mel-scale spectrogram to which the multi-head attention function is applied, to generate a decoder output, and the predicting the output mel-scale spectrogram may include predicting the output mel-scale spectrogram, based on the decoder output.

The character embeddings may be related to one or more linguistic features of input text, and the input mel-scale spectrogram and the output mel-scale spectrogram may be related to one or more acoustic features of the one or more linguistic features.

Though self-attention shows its ability in modeling long-range dependencies, only using self-attention is not as good as recurrent networks in modeling hierarchical structures.

Thus, in embodiments, a multi-tower hybrid system is used to make use of advantages of both recurrent units and a self-attention mechanism.

Although FIG. 5 shows example blocks of the method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel.

Figure 7:
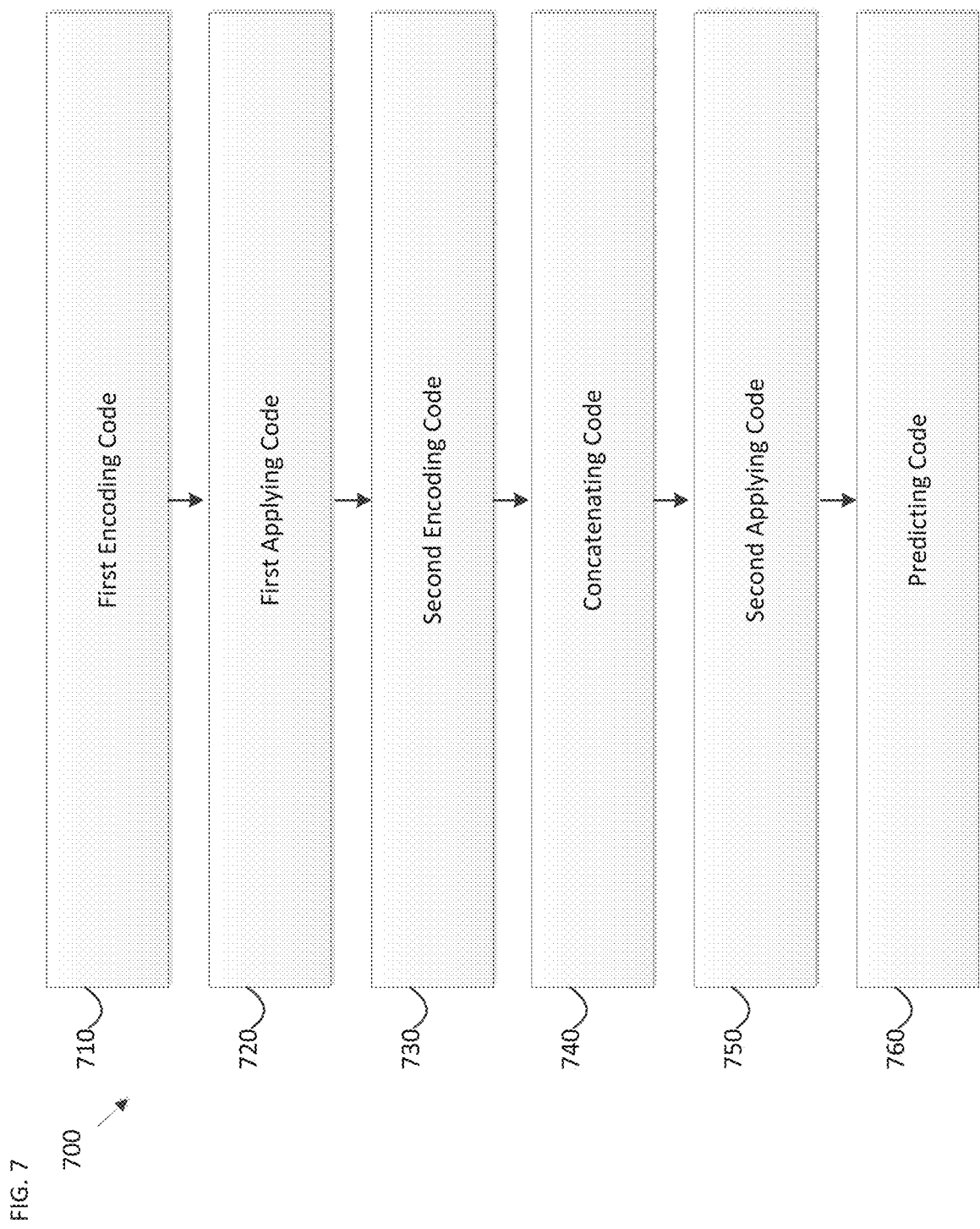
FIG. 7 is a diagram of an apparatus for performing speech synthesis, according to embodiments.

FIG. 7 is a diagram of an apparatus 700 for performing speech synthesis, according to embodiments. As shown in FIG. 7, the apparatus 700 includes first encoding code 710, first applying code 720, second encoding code 730, concatenating code 740, second applying code 750 and predicting code 760.

The first encoding code 710 is configured to encode character embeddings, using any one or any combination of convolutional neural networks (CNNs) and recurrent neural networks (RNNs).

The first applying code 720 is configured to apply a relative-position-aware self attention function to each of the character embeddings and an input mel-scale spectrogram.

The second encoding code 730 is configured to encode the character embeddings to which the relative-position-aware self attention function is applied.

The concatenating code 740 is configured to concatenate the encoded character embeddings and the encoded character embeddings to which the relative-position-aware self attention function is applied, to generate an encoder output.

The second applying code 750 is configured to apply a multi-head attention function to the encoder output and the input mel-scale spectrogram to which the relative-position-aware self attention function is applied.

The predicting code 760 is configured to predict an output mel-scale spectrogram, based on the encoder output and the input mel-scale spectrogram to which the multi-head attention function is applied.

The apparatus 700 may further include generating code configured to generate a speech waveform, based on the predicted output mel-scale spectrogram.

The second applying code 750 may be further configured to modify the multi-head attention function to enhance local relations, using an edge representation for a matrix, and apply the modified multi-head attention function to the encoder output and the input mel-scale spectrogram to which the relative-position-aware self attention function is applied.

The second applying code 750 may be further configured to cause the at least one processor to modify the multi-head attention function to enhance local relations, by clipping, in both directions, a maximum relative position of an edge representation for a matrix, and apply the modified multi-head attention function to the encoder output and the input mel-scale spectrogram to which the relative-position-aware self attention function is applied.

The second encoding code 730 may be further configured to encode the character embeddings to which the relative-position-aware self attention function is applied comprises applying a layer normalization, a sequence of feed forward transformations, and a learned linear transformation to the relative-position-aware self attention function is applied.

The apparatus 700 may further include decoding code configured to apply a layer normalization, a sequence of feed forward transformations, and a learned linear transformation to the encoder output and the input mel-scale spectrogram to which the multi-head attention function is applied, to generate a decoder output, and the predicting code 760 may be further configured to predict the output mel-scale spectrogram, based on the decoder output.

The character embeddings may be related to one or more linguistic features of input text, and the input mel-scale spectrogram and the output mel-scale spectrogram may be related to one or more acoustic features of the one or more linguistic features.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of performing speech synthesis, the method comprising:

encoding character embeddings, using any one or any combination of convolutional neural networks (CNNs) and recurrent neural networks (RNNs);

applying a relative-position-aware self attention function to each of the character embeddings and an input mel-scale spectrogram;

encoding the character embeddings to which the relative-position-aware self attention function is applied, by applying a layer normalization, a sequence of feed forward transformations, and a learned linear transformation to the character embeddings to which the relative-position-aware self attention function is applied;

concatenating the encoded character embeddings and the encoded character embeddings to which the relative-position-aware self attention function is applied, to generate an encoder output;

applying a multi-head attention function to the encoder output and the input mel-scale spectrogram to which the relative-position-aware self attention function is applied; and predicting an output mel-scale spectrogram, based on the encoder output and the input mel-scale spectrogram to which the multi-head attention function is applied.

2. The method of claim 1, further comprising generating a speech waveform, based on the predicted output mel-scale spectrogram.

3. The method of claim 1, wherein the applying the multi-head attention function comprises:

modifying the multi-head attention function to enhance local relations, using an edge representation for a matrix; and applying the modified multi-head attention function to the encoder output and the input mel-scale spectrogram to which the relative-position-aware self attention function is applied.

4. The method of claim 1, wherein the applying the multi-head attention function comprises:

modifying the multi-head attention function to enhance local relations, by clipping, in both directions, a maximum relative position of an edge representation for a matrix; and applying the modified multi-head attention function to the encoder output and the input mel-scale spectrogram to which the relative-position-aware self attention function is applied.

5. The method of claim 1, further comprising applying the layer normalization, the sequence of feed forward transformations, and the learned linear transformation to the encoder output and the input mel-scale spectrogram to which the multi-head attention function is applied, to generate a decoder output, wherein the predicting the output mel-scale spectrogram comprises predicting the output mel-scale spectrogram, based on the decoder output.

6. The method of claim 1, wherein the character embeddings are related to one or more linguistic features of input text, and the input mel-scale spectrogram and the output mel-scale spectrogram are related to one or more acoustic features of the one or more linguistic features.

7. An apparatus for performing speech synthesis, the apparatus comprising:

at least one memory configured to store program code; and at least one processor configured to read the program code and operate as instructed by the program code, the program code including:

first encoding code configured to cause the at least one processor to encode character embeddings, using any one or any combination of convolutional neural networks (CNNs) and recurrent neural networks (RNNs);

first applying code configured to cause the at least one processor to apply a relative-position-aware self attention function to each of the character embeddings and an input mel-scale spectrogram;

second encoding code configured to cause the at least one processor to encode the character embeddings to which the relative-position-aware self attention function is applied, by applying a layer normalization, a sequence of feed forward transformations, and a learned linear transformation to the character embeddings to which the relative-position-aware self attention function is applied;

concatenating code configured to cause the at least one processor to concatenate the encoded character embeddings and the encoded character embeddings to which the relative-position-aware self attention function is applied, to generate an encoder output;

second applying code configured to cause the at least one processor to apply a multi-head attention function to the encoder output and the input mel-scale spectrogram to which the relative-position-aware self attention function is applied; and predicting code configured to cause the at least one processor to predict an output mel-scale spectrogram, based on the encoder output and the input mel-scale spectrogram to which the multi-head attention function is applied.

8. The apparatus of claim 7, further comprising generating code configured to cause the at least one processor to generate a speech waveform, based on the predicted output mel-scale spectrogram.

9. The apparatus of claim 7, wherein the second applying code is further configured to cause the at least one processor to:
modify the multi-head attention function to enhance local relations, using an edge representation for a matrix; and
apply the modified multi-head attention function to the encoder output and the input mel-scale spectrogram to which the relative-position-aware self attention function is applied.

10. The apparatus of claim 7, wherein the second applying code is further configured to cause the at least one processor to:
modify the multi-head attention function to enhance local relations, by clipping, in both directions, a maximum relative position of an edge representation for a matrix; and
apply the modified multi-head attention function to the encoder output and the input mel-scale spectrogram to which the relative-position-aware self attention function is applied.

11. The apparatus of claim 7, further comprising decoding code configured to cause the at least one processor to apply the layer normalization, the sequence of feed forward transformations, and the learned linear transformation to the encoder output and the input mel-scale spectrogram to which the multi-head attention function is applied, to generate a decoder output,
wherein the predicting code is further configured to cause the at least one processor to predict the output mel-scale spectrogram, based on the decoder output.

12. The apparatus of claim 7, wherein the character embeddings are related to one or more linguistic features of input text, and
the input mel-scale spectrogram and the output mel-scale spectrogram are related to one or more acoustic features of the one or more linguistic features.

13. A non-transitory computer-readable medium storing instructions that, when executed by at least one processor of a device, cause the at least one processor to:
encode character embeddings, using any one or any combination of convolutional neural networks (CNNs) and recurrent neural networks (RNNs);
apply a relative-position-aware self attention function to each of the character embeddings and an input mel-scale spectrogram;
encode the character embeddings to which the relative-position-aware self attention function is applied, by applying a layer normalization, a sequence of feed forward transformations, and a learned linear transformation to the character embeddings to which the relative-position-aware self attention function is applied;
concatenate the encoded character embeddings and the encoded character embeddings to which the relative-position-aware self attention function is applied, to generate an encoder output;
apply a multi-head attention function to the encoder output and the input mel-scale spectrogram to which the relative-position-aware self attention function is applied; and
predict an output mel-scale spectrogram, based on the encoder output and the input mel-scale spectrogram to which the multi-head attention function is applied.

14. The non-transitory computer-readable medium of claim 13, wherein the instructions further cause the at least one processor to generate a speech waveform, based on the predicted output mel-scale spectrogram.

15. The non-transitory computer-readable medium of claim 13, wherein the instructions further cause the at least one processor to:
modify the multi-head attention function to enhance local relations, using an edge representation for a matrix; and
apply the modified multi-head attention function to the encoder output and the input mel-scale spectrogram to which the relative-position-aware self attention function is applied.

16. The non-transitory computer-readable medium of claim 13, wherein the instructions further cause the at least one processor to:
modify the multi-head attention function to enhance local relations, by clipping, in both directions, a maximum relative position of an edge representation for a matrix; and
apply the modified multi-head attention function to the encoder output and the input mel-scale spectrogram to which the relative-position-aware self attention function is applied.

17. The non-transitory computer-readable medium of claim 13, wherein the instructions further cause the at least one processor to:
apply the layer normalization, the sequence of feed forward transformations, and the learned linear transformation to the encoder output and the input mel-scale spectrogram to which the multi-head attention function is applied, to generate a decoder output; and predict the output mel-scale spectrogram, based on the decoder output.

\* \* \* \* \*